United States Patent [19]

Nagano

[11] Patent Number: 4,744,784

[45] Date of Patent: May 17, 1988

[54] REAR DERAILLEUR FOR A BICYCLE

[75] Inventor: Masashi Nagano, Izumi, Japan

[73] Assignee: Shimano Industrial Company Limited, Osaka, Japan

[21] Appl. No.: 35,383

[22] Filed: Apr. 7, 1987

[30] Foreign Application Priority Data

Apr. 12, 1986 [JP] Japan ............................ 61-55127[U]

[51] Int. Cl.[4] ............................................ F16H 9/00
[52] U.S. Cl. ............................................ 474/80
[58] Field of Search ........................... 474/78–83

[56] References Cited

U.S. PATENT DOCUMENTS 4,573,949 3/1986 Nagano .......................... 474/80
4,670,000 6/1987 Nagano .......................... 474/80
4,692,131 9/1987 Nagano .......................... 474/80

FOREIGN PATENT DOCUMENTS 0163583 12/1985 European Pat. Off.
3616862 12/1986 Fed. Rep. of Germany.

Primary Examiner—Stephen J. Novosad
Assistant Examiner—Thuy M. Bui
Attorney, Agent, or Firm—Stevens, Davis, Miller & Mosher

[57] ABSTRACT

A rear derailleur for a bicycle, in which a movable member includes a blind shaft bore for a support shaft supporting a chain guide. The shaft bore is open only at its end adjacent the end face of the movable member opposite to the chain guide. The support shaft is rotatably supported in the blind shaft bore and is provided at its intermediate portion with a locking shoulder. A locking member having a thrust bearing surface opposite to the locking shoulder is fixed to the movable member. This supports the chain guide to the movable member such that it is well sealed and protected from escaping.

7 Claims, 2 Drawing Sheets ant shaft 6 to the roller plate 53 and support-

REAR DERAILLEUR FOR A BICYCLE

BACKGROUND OF THE INVENTION

The present invention relates to a rear derailleur for a bicycle, and more particularly, to a rear derailleur for a bicycle, which is provided with a chain guide through which a driving chain is guided to be selectively shifted from one sprocket to another of a multistage sprocket assembly for changing the bicycle speed.

BACKGROUND OF THE INVENTION

The above type of rear derailleur for a bicycle has hitherto been well-known and is disclosed in, for example, Japanese Utility Model Publication Gazette No. Sho 55-4,221. This rear derailleur is provided with a base member, a movable member supported movably thereto through a pair of linkage members, and a chain guide having a guide roller, a tension roller and a roller plate supporting these rollers, with the roller plate being supported swingably to the movable member through a support shaft which passes through a shaft bore formed in the movable member.

In the rear derailleur for the bicycle constructed as described above, a gap is formed between the outside surface of the movable member and the support shaft, and rain water or the like enters into the movable member through the gap. In particular, a spring for biasing the roller plate of the chain guide to apply tension to the driving chain is housed in the movable member, thereby creating a problem in that rain water entering therein will rust the spring.

SUMMARY OF THE INVENTION

An object of the invention is to provide a rear derailleur for a bicycle, which is provided at the movable member with a blind shaft bore instead of the aforesaid through shaft bore, so that a support shaft inserted into the blind shaft bore swingably supports a chain guide, thereby avoiding entrance of rain water or the like into the movable member.

In order to attain the above object, the present invention has been designed as follows: A rear derailleur for a bicycle, provided with a base member, a movable member supported axially movably of the multistage sprocket assembly with respect to the base member, and a chain guide provided with a guide roller, a tension roller and a roller plate and supported swingably to the movable member, is characterized in that the movable member has formed therein a blind shaft bore open only at an end face of the movable member opposite to the roller plate. The support shaft is inserted into the blind shaft bore to be rotatably supported therein and is fixed to the roller plate. At an intermediate portion of the support shaft is provided a radially extending locking shoulder, and a locking member having a thrust bearing surface abutting against the locking shoulder is fixed to the movable member through a fixing means.

The blind bore is formed as described and has inserted therein and the support shaft for the chain guide, so that there is no gap formed between the shaft bore and the support shaft as in the conventional derailleur, thereby preventing rain water or the like from entering into the movable member. Moreover, since a thrust load applied to the support shaft is received by the locking shoulder and the thrust bearing surface of the lock member in a surface-contacting condition, this ensures that the support shaft is supported rotatably to the movable member.

Furthermore, the support shaft is held to the movable member by the locking member in a predetermined position to prevent it from escaping from the movable member.

Other objects and aspects of the invention will become apparent from the following description of the disclosed embodiment with reference to the accompanying drawings.

DETAILED DESCRIPTION OF THE INVENTION

Figure 3:
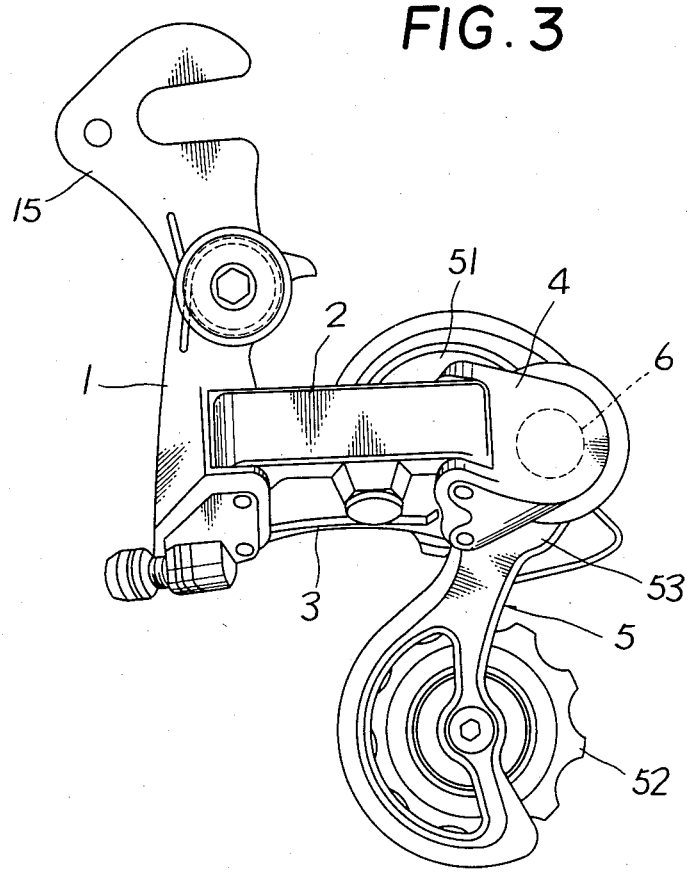
FIG. 3 is a full structural front view of the rear derailleur for the bicycle of the invention.

A rear derailleur for a bicycle according to the invention is fundamentally constructed as shown in FIG. 3, which is provided with a base member 1, a pair of parallel linkage members 2 and 3 and a movable member 4. Base member 1 and movable member 4 are connected with each other through the linkage members 2 and 3. Movable member 4 is supported with respect to the base member 1 to be movable axially of a multistage sprocket assembly (not shown) mounted on the rear wheel of the bicycle. The derailler also includes chain guide 5 having a guide roller 51, a tension roller 52 and a roller plate 53 rotatably supporting the guide and tension rollers 51 and 52, the roller plate 53 being supported swingably to the movable member 4 through a support shaft 6.

In the above-described rear derailleur for the bicycle, the roller plate 53 is supported to the movable member 4 through a supporting mechanism constructed as described below.

Figure 1:
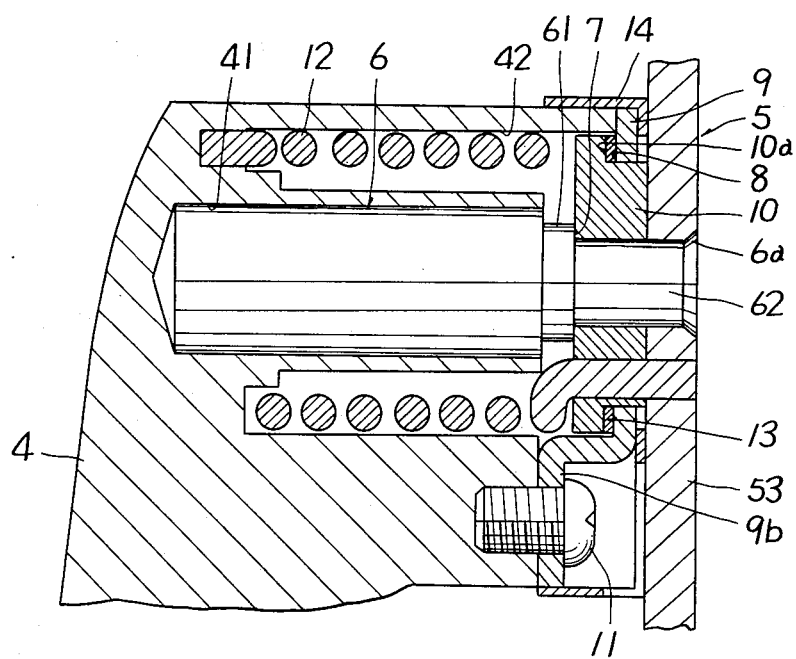
FIG. 1 is a sectional view of an embodiment of a rear derailleur for a bicycle of the invention, showing the principal portion thereof.
Figure 2:
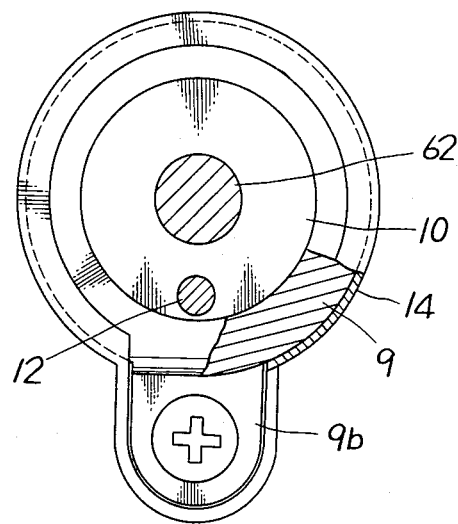
FIG. 2 is a cutaway side view of the principal portion of the FIG. 1 embodiment, from which a roller plate is removed.

As shown in detail in FIG. 1, at the movable member 4 is formed a blind shaft bore 41 open only at the end surface of the movable member 4 opposite to the roller plate 53, and the support shaft 6 is inserted and rotatably supported in blind bore 41. Support shaft 6 is fitted at its outer end into the roller plate 53 and caulked at 6a thereto.

At an intermediate portion of the support shaft 6 is formed an annular locking shoulder 7 extending radially thereof. An annular locking member 9 having an annular thrust bearing surface in surface-contact with the locking shoulder 7 is formed to be fixed to the movable member 4 by a fixing means to be described in detail below.

Specifically, an intermediate shaft portion 61 slightly smaller in diameter than the blind bore 41 is formed at a lengthwise intermediate portion of the support shaft 6 and outside the blind bore 41, and a smaller diameter shaft portion 62 smaller in diameter than the intermediate shaft portion 61 is formed at the outside thereof. A thrust collar 10 to be described below and the roller plate 53 at the chain guide 5 are fitted onto the smaller diameter shaft portion 62 and the axial outer end thereof is calked, thereby fixing the roller plate 53 and supporting the thrust collar 10 such that it is not movable axially. Thus, the thrust collar 10 is used to reliably rotatably support the roller plate 53, and turn the chain guide 5, without creating a backlash.

In other words, the locking shoulder 7 is formed at the border of the smaller diameter shaft portion 62 and intermediate shaft portion 61 of the support shaft 6 and the thrust collar 10 is fitted onto the smaller diameter shaft portion 62 to abut against the inner surface thereof against the locking shoulder 7 and is retained thereto. Then in such condition, the support shaft 6 is fixed to the roller plate 53. An engaging shoulder 10a is formed at the outer peripheral portion of the thrust collar 10 opposite to the roller plate 53, and the locking member 9 is fitted onto the thrust collar 10 in a manner of abutting at the bearing surface 8 against the engaging shoulder 10a.

Furthermore, at the locking member 9 is formed a mounting portion 9b extending radially outwardly from the outer periphery of the locking member 9 and bent stepwise as shown in FIG. 1, and in condition of allowing the mounting portion 9b to abut against the outer end face of the movable member 4, a fixing bolt 11 screws therewith from the outside of the locking member 9. Thus, a thrust load acting on the support shaft 6 in the escaping direction can reliably be received by the movable member 4 which receives the load through the locking shoulder 7, thrust collar 10 and locking member 9. Also, not only is wear reduced at the surface-contact portion of each part, but also the chain guide 5 when operated avoids a backlash and a sealing effect is improved. Moreover, the locking member 9 is fixed to the movable member 4 by the fixing bolt 11, thereby ensure locking of the support shaft 6, and in turn the chain guide 5.

Also, the thrust collar 10, as described above, is interposed between the locking shoulder 7 and the roller plate 53, and the support shaft 6 is fixed thereto. As a result, support shaft 6, roller plate 53, thrust collar 10 and a cover to be described below are connected as a unit so as to improve the built-in work efficiency for the movable member 4.

The above-described embodiment may alternatively use a fixing means other than the fixing bolt 11 as described above.

In the embodiment, a coil spring chamber 42 is formed in the movable member 4 and around the blind shaft bore 41 and a coil spring 12 is retained at one lengthwise end thereof to the movable member 4 and at the other end to the roller plate 53 at the chain guide 5 and housed in the chamber 42. By this structure, roller plate 53 is biased in one direction by the coil spring 12, thereby applying tension to the driving chain.

In FIG. 1, reference numeral 13 designates a lubricant interposed between the shoulder 10a at the thrust collar 10 and the locking member 9, and 14 designates a cover mounted between the roller plate 53 at the chain guide 5 and the movable member 4 so as to cover the open side surface thereof.

Also, in FIG. 3, on one lengthwise end of the base member 1, a fixing member 15 is rotatably mounted, through which the rear derailleur is supported to the bicycle frame.

Figure 4:
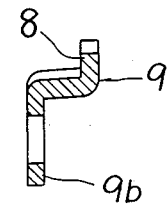
FIG. 4 is a sectional view of a modified embodiment of the locking member according to the invention.
Figure 5:
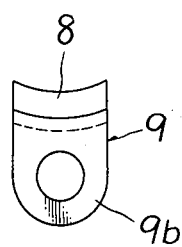
FIG. 5 is a side view of the FIG. 4 embodiment.

Alternatively, the lock member 9 may be nonannular but, may have a shape for example, as shown in FIGS. 4 and 5.

As seen from the above, the rear derailleur for the bicycle of the invention, which is provided at the blind bore 41 receiving therein the support shaft 6 which is mounted on the roller plate 53 at the chain guide 5, can reliably prevent rain water or the like from entering into the movable member 4 through the gap between the support shaft 6 and the movable member 4. Moreover, the locking shoulder 7 and thrust bearing surface 8 of the locking member 9 fixed to the movable member 4 as described above can bear the thrust load in the condition of surface-contact, thereby enabling the support shaft 6 to be rotatably supported to the movable member 4.

While an embodiment of the invention has been shown and described, the invention is not limited to the specific constsruction thereof, which is merely exemplary in the specification rather than defined.

What is claimed is:

1. A rear derailleur for a bicycle for shifting a driving chain from one sprocket to another of a multistage sprocket assembly having a plurality of axially spaced substantially parallel sprockets, said derailleur comprising:
   a base member,
   a movable member supported relative to said base member to be movable along a predetermined direction adapted to correspond to an axial direction of said sprocket assembly when said derailleur is mounted on said bicycle,
   a chain guide,
   a support mechanism supporting said chain guide on said movable member,
   said chain guide including a roller plate rotatably supported to said movable member, a guide roller and a tension roller both rotatably supported on said roller plate,
   said support mechanism comprising a support shaft which is fixed to said roller plate and which includes a locking face at an intermediate portion thereof, said locking face extending radially of said support shaft,
   said movable member including a blind shaft bore closed on one end and open at its other end which is disposed opposite to said roller plate, said support shaft being rotatably disposed within said blind shaft bore,
   a locking member having a thrust bearing surface extending radially of said support shaft and facing said locking face, and
   means for fixing said locking member to said movable member.

2. A rear derailleur for a bicycle according to claim 1, further comprising a thrust collar having an inner surface axially facing said locking face of said support shaft, an annular engaging face facing said roller plate, and a central shaft bore, said thrust bearing surface of said lock member facing said engaging face at said thrust collar.

3. A rear derailleur for a bicycle according to claim 2, wherein said thrust collar is interposed between said locking face of said support shaft and said roller plate, said support shaft being fixed to said roller plate such that it is non-axially movable relative thereto.

4. A rear derailleur for a bicycle according to claim 2, wherein an annular lubricant means is interposed between said engaging face and said thrust bearing surface.

5. A rear derailleur for a bicycle according to claim 2, wherein said movable member is provided with a spring housing chamber which is disposed radially outwardly of said shaft bore, said housing chamber having an open end only at the end of said movable member disposed opposite to said roller plate, said housing chamber housing a coil spring retained at one end to said movable member and at its other end to said roller plate.

6. A rear derailleur for a bicycle according to claim 5, wherein said thrust collar comprises an outer peripheral portion for closing the open end of said spring housing chamber and a spring insertion bore through which said other end of said spring is inserted.

7. A rear derailleur for a bicycle according to claim 6, wherein said movable member is provided with a cover covering the outer surface of said locking member.

* * * * *